(12) United States Patent
Kontani et al.

(10) Patent No.: US 9,016,421 B2
(45) Date of Patent: Apr. 28, 2015

(54) FRONT AIR GUIDING STRUCTURE OF MOTORCYCLE

(71) Applicant: Honda Motor Co., Ltd., Tokyo (JP)

(72) Inventors: Masahiro Kontani, Wako (JP); Yoshinori Korogi, Wako (JP); Satoru Kubo, Wako (JP); Takahiro Sano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 13/873,434

(22) Filed: Apr. 30, 2013

(65) Prior Publication Data
US 2013/0306391 A1 Nov. 21, 2013

(30) Foreign Application Priority Data

May 17, 2012 (JP) ................................. 2012-113016

(51) Int. Cl.
| | | |
|---|---|---|
| *B62D 61/02* | (2006.01) | |
| *B62K 11/00* | (2006.01) | |
| *B62J 17/02* | (2006.01) | |
| *B62K 11/04* | (2006.01) | |

(52) U.S. Cl.
CPC .................. *B62K 11/00* (2013.01); *B62J 17/02* (2013.01); *B62K 11/04* (2013.01)

(58) Field of Classification Search
CPC .......... B62K 11/04; B62K 3/007; F02B 61/02
USPC ................................................ 180/218, 219
See application file for complete search history.

(56) References Cited

U.S. PATENT DOCUMENTS

| | | | |
|---|---|---|---|
| 7,270,207 B2* | 9/2007 | Idei et al. ...................... | 180/68.3 |
| 7,827,955 B2* | 11/2010 | Matsuda et al. ......... | 123/195 AC |
| 8,006,791 B2* | 8/2011 | Nakagome et al. .......... | 180/68.1 |
| 8,122,990 B2* | 2/2012 | Suzuki .......................... | 180/68.6 |
| 2005/0051375 A1* | 3/2005 | Momosaki .................... | 180/219 |
| 2006/0054372 A1* | 3/2006 | Ohzono et al. ................ | 180/229 |
| 2006/0076177 A1* | 4/2006 | Arnold .......................... | 180/219 |
| 2010/0193275 A1* | 8/2010 | Song et al. .................... | 180/219 |

FOREIGN PATENT DOCUMENTS

JP  2006-347343 A  12/2006

* cited by examiner

*Primary Examiner* — Tony Winner
(74) *Attorney, Agent, or Firm* — Birch, Stewart, Kolasch & Birch, LLP

(57) ABSTRACT

In a motorcycle having an air intake passage guiding an air flow to an internal combustion engine is formed between an upper surface of a front fender and a bottom plate of a front cowl covering a head pipe from the front and disposed just above a front wheel. The cooling performance of a heat exchanger disposed behind the front wheel and in front of an engine body is improved with a decrease in the air resistance by lowering the position of the front cowl. At least a part of an air intake duct is disposed above a front fender for supplying the air guided from an air flow inlet provided on the front end portion of a front cowl to an inlet system of an internal combustion engine. At least a part of the air intake duct forming a rear air intake passage is contained in the front cowl.

20 Claims, 9 Drawing Sheets

FRONT AIR GUIDING STRUCTURE OF MOTORCYCLE

CROSS-REFERENCE TO RELATED APPLICATIONS

The present application claims priority under 35 USC 119 to Japanese Patent Application No. 2012-113016 filed May 17, 2012 the entire contents of which are hereby incorporated by reference.

BACKGROUND OF THE INVENTION

1. Field of the Invention

The present invention relates to a motorcycle wherein an engine body of an internal combustion engine is mounted on a body frame with a front fork steerably supported by a head pipe on the front end portion of the body frame for axially supporting the front wheel. The front fender covers at least a part of the front wheel from above. A heat exchanger is disposed behind the front wheel and in front of the engine body. An air intake passage is provided for guiding an air flow to the internal combustion engine side. The air intake passage is formed between an upper surface of the front fender and a bottom plate of a front cowl for covering the head pipe from the front. The air intake passage is disposed just above the front wheel and is supported on the body frame. The present invention especially relates to an improvement with respect to the front air guiding structure for guiding the air flow to the heat exchanger side.

2. Description of Background Art

As disclosed in Japanese Laid-Open Patent Publication No. 2006-347343, a motorcycle includes a radiator disposed behind the front wheel and in front of the internal combustion engine. A clearance is set to form the air intake passage between a front cowl covering a head pipe on the front end portion of the body frame from the front and simultaneously disposed just above the front wheel. The front fender covers at least a part of the front wheel from above. Accordingly, a part of the air flow is guided from the air intake passage to the radiator side. Thus, the amount of the air flow flowing around the radiator is increased, and the cooling performance of the radiator can be enhanced.

SUMMARY AND OBJECTS OF THE INVENTION

A motorcycle with a smaller projecting area on the front surface can reduce more air resistance during traveling. Thus, in the motorcycle mounting the front cowl as above-mentioned it is required to lower the position of the front cowl as much as possible. More specifically, the front cowl is designed so as to dispose the front cowl in the vicinity of the front fender in a state wherein the front fork supporting the front wheel is maximally contracted without interfering with the front cowl and the front fender. In such a design, an air intake guide is provided so as to more positively guide the air flow flowing rearwardly along the lower edge of the front cowl to the radiator side in order to enhance the cooling performance of the radiator. When the air intake guide is provided on the lower edge of the front cowl, the front cowl should be positioned higher for avoiding interference of the air intake guide and the front fender. Enhancing the cooling performance by the air intake guide had been incompatible with decreasing the air resistance by lowering the position of the front cowl.

The present invention has been made in the view of such circumstances. According to an embodiment of the present invention, a front air guiding structure of a motorcycle is provided which can realize an enhancement of the cooling performance of the heat exchanger and a decrease of the air resistance by lowering the position of the front cowl.

In order to achieve the objects according to an embodiment of the present invention, in a motorcycle having an engine body of an internal combustion engine mounted on a body frame, a front fork is steerably supported by a head pipe on the front end portion of the body frame for axially supporting a front wheel and also for supporting the front fender covering at least a part of the front wheel from above. A heat exchanger is disposed behind the front wheel and in front of the engine body. An air intake passage for guiding the air flow to the internal combustion engine side is formed between an upper surface of the front fender and a bottom plate of a front cowl covering the head pipe from the front and disposed just above the front wheel and supported on the body frame.

According to an embodiment of the present invention, at least a part of an air intake duct is contained in the front cowl so as to supply the air guided from an air flow inlet provided on the front end portion of the front cowl to an inlet system of the internal combustion engine, so as to be disposed above the front fender, and simultaneously so as to form a rear air intake passage connecting to the air intake passage from behind between the air intake duct and the front fender. An air guiding portion is provided for guiding the air flow to the heat exchanger side. The air-guiding portion projects at least on the lower surface of a lowest bottom wall of the air intake duct.

According to an embodiment of the present invention, at least a part of the single air intake duct includes a rectangular cross-sectional shape and is contained in the front cowl at the center portion in the width direction of the vehicle. The air guiding portion extends to the width direction of the vehicle and is integrally formed so as to project downward on the flat lower surface of the lowest bottom wall of the air intake duct.

According to an embodiment of the present invention, the lowest bottom wall of the air intake duct is disposed from behind in the vicinity of the center portion along the width direction of the vehicle of the bottom plate of the front cowl with the air guiding portion being integrally formed at least on the front end portion of the lower surface of the lowest bottom wall.

According to an embodiment of the present invention, the lower surface of the lowest bottom wall is formed so as to include a continuously inclined surface so as to be gradually lowered as it extends rearwardly.

According to an embodiment of the present invention, the plurality of air guiding portions are integrally formed so as to be spaced apart in the forward and rearward directions on the lower surface of the lowest bottom wall.

According to an embodiment of the present invention, the rearmost air guiding portion among the plurality of air guiding portions is integrally formed at the rearmost end of the lower surface of the lowest bottom wall.

According to an embodiment of the present invention, at least the lowest bottom wall of the air intake duct is formed so as to gradually extend the width along the width direction of the vehicle as it extends rearwardly. The widths along the width direction of the vehicle of the plurality of air guiding portions are disposed so as to be spaced apart in the forward and rearward directions and are differently set from each other according to the width of the lowest bottom wall.

According to an embodiment of the present invention, a groove is formed on the lower surface of the center portion along the width direction of the vehicle of the bottom plate of the front cowl so as to be concaved upwardly and so as to extend towards the forward and rearward directions, the air guiding portion is disposed within the maximum width of the groove in the front view of the vehicle.

According to an embodiment of the present invention, a concaved portion concaved forward in a V-shape in a plane view is formed on the rear end of the central portion along the width direction of the vehicle of the bottom plate of the front cowl, the air guiding portion is disposed within the concaved portion in the plane view.

According to an embodiment of the present invention, at least a part of the air intake duct which supplies the air guided from the air flow inlet provided on the front end portion of the front cowl to an inlet system of an internal combustion engine is contained in the front cowl so as to form the rear air intake passage between the air intake duct and the front fender, which is connected from behind to the air intake passage formed between the front cowl and the front fender. The air guiding portion guiding the air flow to the heat exchanger side projects at least on the lower surface of the lowest bottom wall of the air intake duct. Accordingly, the air flow flowing through the air intake passage and the rear air intake passage is guided to the heat exchanger side, which can enhance the cooling performance of the heat exchanger. Moreover, since the air guiding portion is not provided on the front cowl, the front cowl is not bulged downward by the air guiding portion. The air resistance can be reduced by lowering the position of the front cowl.

According to an embodiment of the present invention, at least a part of the single air intake duct having a rectangular cross-sectional shape is contained in the front cowl at the center portion in the width direction of the vehicle. The air guiding portion extending to the width direction of the vehicle is integrally formed on the flat lower surface of the lowest bottom wall of the air intake duct. Accordingly, the air guiding portion is formed so as to be wide in the width direction of the vehicle for increasing the area thereof, which can enhance the air intake effect.

According to an embodiment of the present invention, the lowest bottom wall of the air intake duct is disposed from behind in the vicinity of the center portion along the width direction of the vehicle of the bottom plate of the front cowl, and the air guiding portion is integrally formed at least on the front end portion of the lower surface of the lowest bottom wall. Accordingly, the air guiding portion just behind the bottom plate can certainly guide the air flow flowing along the lower surface of the bottom plate of the front cowl to the heat exchanger side.

According to an embodiment of the present invention, the lower surface of the lowest bottom wall of the air intake dust is formed as the continuously inclined surface inclined downwardly towards the rear direction. Accordingly, the lower surface of the lowest bottom wall can certainly guide the air flow to the heat exchanger side.

According to an embodiment of the present invention, the plurality of air guiding portions are disposed so as to be spaced apart in the forward and rearward directions. Accordingly, even if the front portion of the motorcycle tends to be lifted due to the posterior load during acceleration of the motorcycle, any one of the plurality of air guiding portions can guide the air flow. The air intake effect to the heat exchanger side can be expected regardless of the driving state of the motorcycle.

According to an embodiment of the present invention, the rearmost air guiding portion is integrally formed at the rearmost end of the lower surface of the lowest bottom wall of the air intake duct. Accordingly, the rearmost air guiding portion can guide the air flow flowing rearwardly along the inclined lower surface of the lowest bottom wall to the heat exchanger side, diverting the flow from the lower surface of the lowest bottom wall, which can enhance the air intake performance.

According to an embodiment of the present invention, at least the lowest bottom wall of the air intake duct is formed so as to gradually extend the width along the width direction of the vehicle as it extends rearwardly. The widths along the width direction of the vehicle of the plurality of air guiding portions are differently set from each other according to the width of the lowest bottom wall. Accordingly, the rear air guiding portion can certainly guide the air flow passing through both sides of the air guiding portion in front thereof.

According to an embodiment of the present invention, the air guiding portion is disposed within the maximum width of the groove which is formed on the lower surface of the center portion along the width direction of the vehicle of the bottom plate of the front cowl so as to extend towards the front and rear directions, in the front view of the vehicle. Accordingly, the air flow can be guided to the air guiding portion side by using the groove of the lower surface of the bottom plate, which can enhance the air intake effect.

According to an embodiment of the present invention, the concaved portion is formed on the rear end of the central portion along the width direction of the vehicle of the bottom plate of the front cowl, and the air guiding portion is disposed within the concaved portion in the plane view. Accordingly, the air guiding portion can be disposed in the vicinity of the front cowl, and the air guiding portion can guide the air flow passing through below the front cowl in the upstream side of the flowing direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
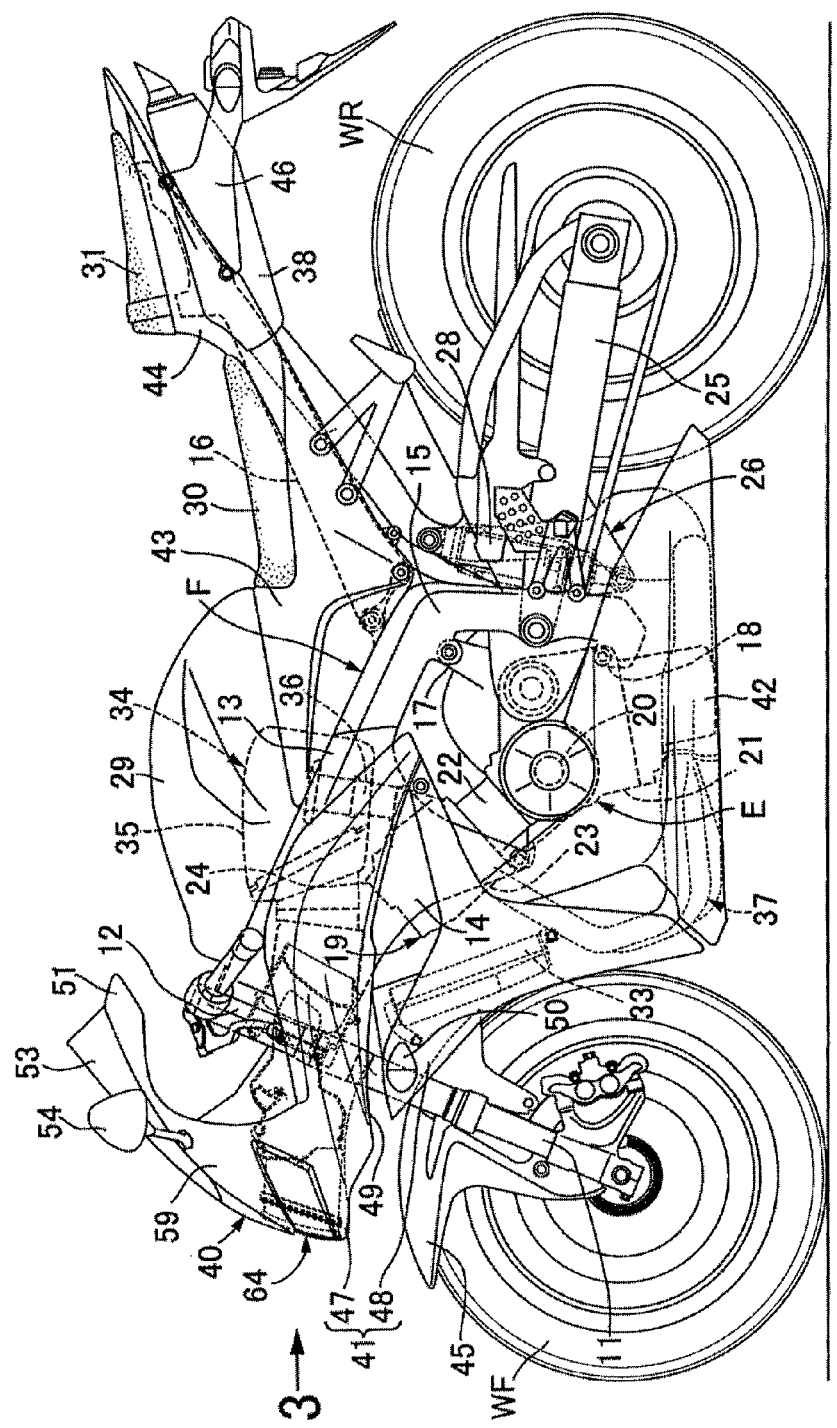
FIG. 1 is a side view of the motorcycle.

The embodiment of present invention will be explained with reference to the attached FIGS. 1 to 9. As illustrated in FIG. 1, a body frame F of this motorcycle includes a head pipe 12 steerably supporting a front fork 11 for axially supporting a front wheel WF. A right and left pair of main frames 13 is provided extending downward towards the rear direction from the head pipe 12 with a right and left pair of engine hangers 14 is provided hanging downward from the front portion of these main frames 13. A right and left pair of pivot frames 15 is integrally and continuously provided on the rear portions of the main frames 13 and extend downward with a right and left pair of seat rails 16 extending upwardly to the rear direction from the rear portion of the main frames 13. In the body frame F, an engine body 19 of a water-cooling internal combustion engine E is disposed under the main frame 13 and is supported on a hanger portion 17 provided on the rear portion of the main frame 13. Hanger portions 18 are provided on the lower portion of a pivot frame 15 with the lower portion of the engine hanger 14. In addition, the front end portion of a swing arm 25 for axially supporting a rear wheel WR driven by the power generated by the internal combustion engine E on the rear end portion is vertically and swingably supported on the lower portion of the pivot frame 15. Moreover, a link mechanism 26 is provided between the front portion of the swing arm 25 and the lower portion of the pivot frame 15 with a rear shock absorber 28 being provided between the link mechanism 26 and the upper portion of the swing arm 25.

A fuel tank 29 is mounted above the internal combustion engine E on the main frame 13. A front seat 30 for a rider is disposed behind the fuel tank 29 and a rear seat 31 for a rider is disposed further behind the front seat for front rider. The front seat 30 and the rear seat 31 are supported on the seat rails 16.

The engine body 19 of the internal combustion engine E includes a crank case 21 rotatably supporting a crank shaft 20 having an axis extending in the width direction of the body frame F. A cylinder block 22 extends upwardly towards the front direction from the upper end of the front portion of the crank case 21. A cylinder head 23 is jointed to the upper end of the cylinder block 22 with a head cover 24 jointed to the upper end of the cylinder head 23 and being configured in an in-line 4 cylinder engine as an example. A radiator 33 which is a heat exchanger is disposed in front of the engine body 19 and behind the front wheel WF so as to be supported on the front portion of the body frame F.

An inlet system 34 connected to the rear portion side surface of the cylinder head 23 has an air cleaner 35 covered by the fuel tank 29 with throttle bodies 36 interposed between the air cleaner 35 and the cylinder head 23 in each cylinder. Furthermore, an exhaust system 37, connected to the front side surface of the cylinder head 22, includes an exhaust muffler 38 on the rear end thereof with the exhaust muffler 38 being disposed above the rear wheel WR.

Figure 2:
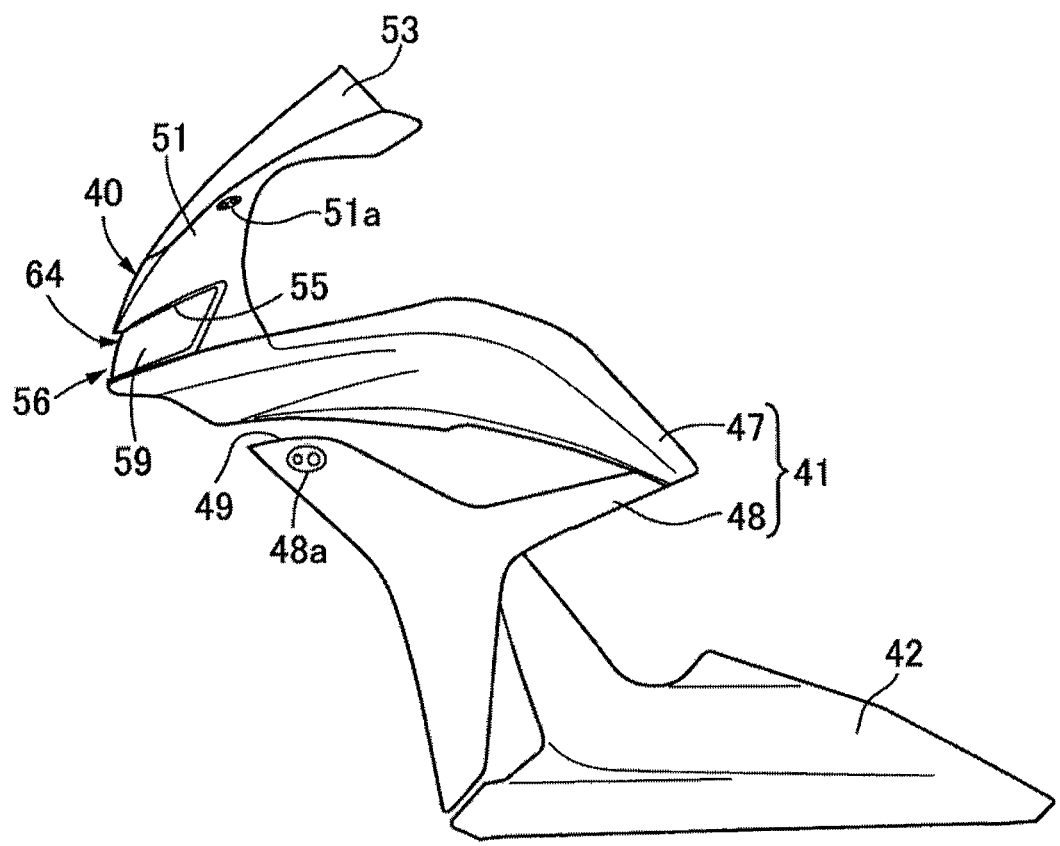
FIG. 2 is a side view illustrating the main part of the cowling.
Figure 3:
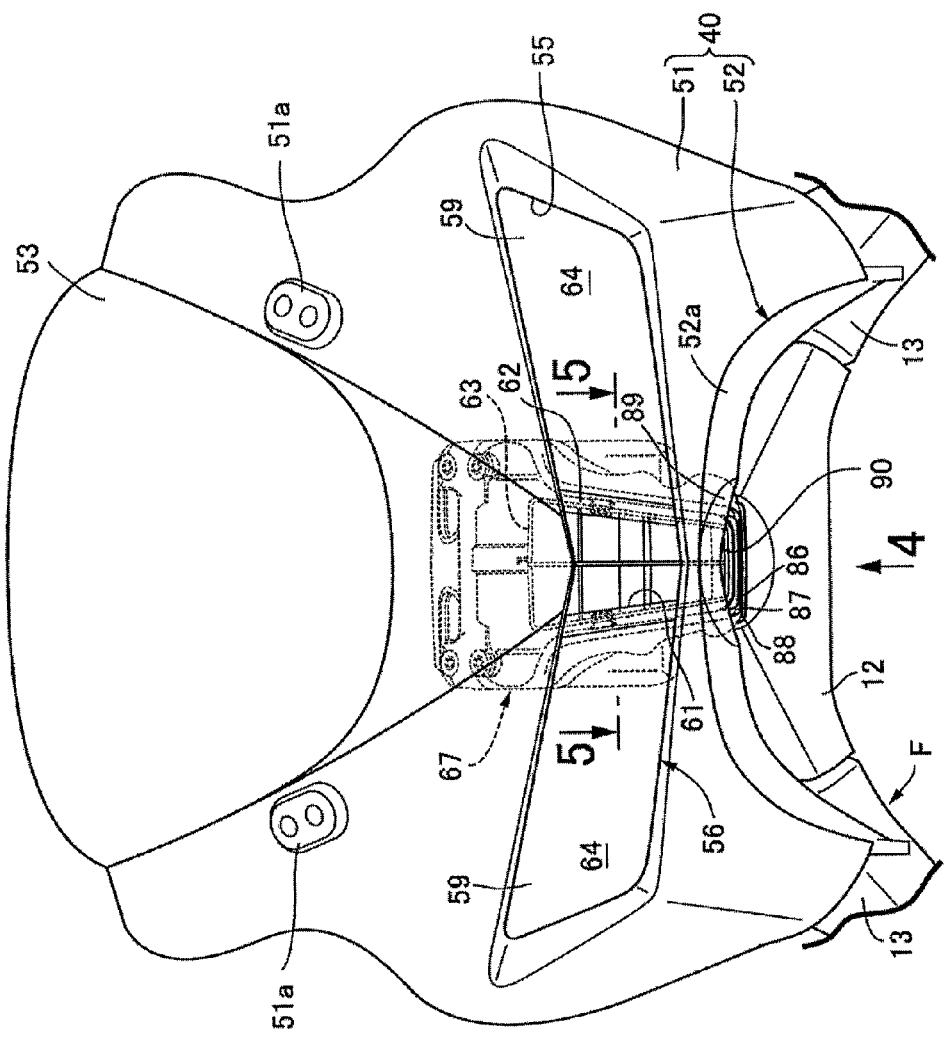
FIG. 3 is an arrow view in the direction of 3-arrow in FIG. 1.

With reference to FIGS. 2 and 3, the head pipe 12 in the front end portion of the body frame F is covered from the front by a front cowl 40 disposed just above the front wheel WF, a right and left pair of center cowls 41 covering the front portion of the body frame F and a part of the internal combustion engine E from the side direction are continuously provided on both right and left sides of the front cowls 40. A right and left pair of lower cowls 42 covering the lower portion of the internal combustion engine E from the side direction and lower direction and simultaneously connected to each other are continuously provided on the rear side lower portions of the center cowls 41. In addition, a right and left pair of side covers 43 covering the rear side lower portion of the fuel tank 29 from both sides are provided between the fuel tank 29 and the front seat for riding 30. A rear cowl 44 extending upwardly towards the rear direction is continuously provided on the rear portion of both side covers 43.

Moreover, a front fender 45 covering at least a part of the front wheel WF from above is supported on the front fork 11. A rear fender 46 covering the rear wheel WR from the rear side upper direction is supported on the rear portion of the seat rail 16.

The center cowl 41 comprises an upper cowl 47 continuously provided on the rear portion of the front cowl 40 and covering the front portion of the body frame F from the side direction with a lower cowl 48 continuously provided on the rear portion of the upper cowl 47. The lower cowl 48 is formed so as to cover the cylinder head 23 and the head cover 24 of the engine body 19; a part of the exhaust system 37 of the internal combustion engine E; and a part of the radiator 33 from the side direction. Furthermore, in order to guide the air flow to the radiator 33 side, an opening portion 49 which crosses the upper portion of radiator 33 in the side view is formed between the upper cowl 47 and the front portion of lower cowl 48 so as to extend in the forward and rearward directions. A blinker mounting seat 48a is formed in order to attach a blinker 50 (see FIG. 1) on the front portion of the lower cowl 48.

Figure 4:
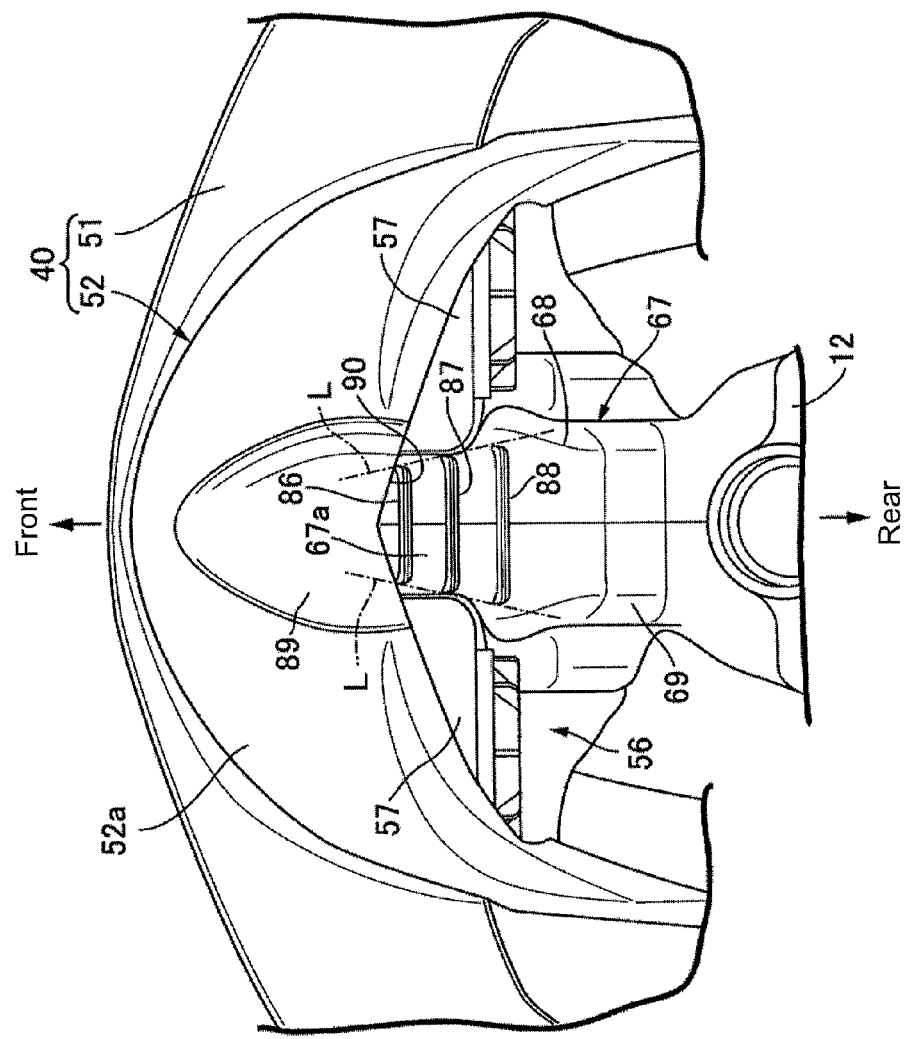
FIG. 4 is an arrow view in the direction of 4-arrow in FIG. 3.

With reference to FIG. 4, the front cowl 40 comprises an outer cowl 51 formed with an approximately U-shape in a cross section; and an inner cowl 52 attached to the lower inner surface of the outer cowl 51. A wind shield 53 is attached to the center upper portion of the outer cowl 51. A right and left pair of mirror mounting seats 51a are formed on the outer cowl 51 in order to attach rear-view mirrors 54 (see FIG. 1) disposed on both right and left sides of the wind shield 53.

In the front cowl 40, an opening portion 55 extending to the width direction of the vehicle is provided on the front lower portion of the outer cowl 51 with a headlight assembling body 56 being arranged at the predetermined position on the opening portion 55.

Figure 5:
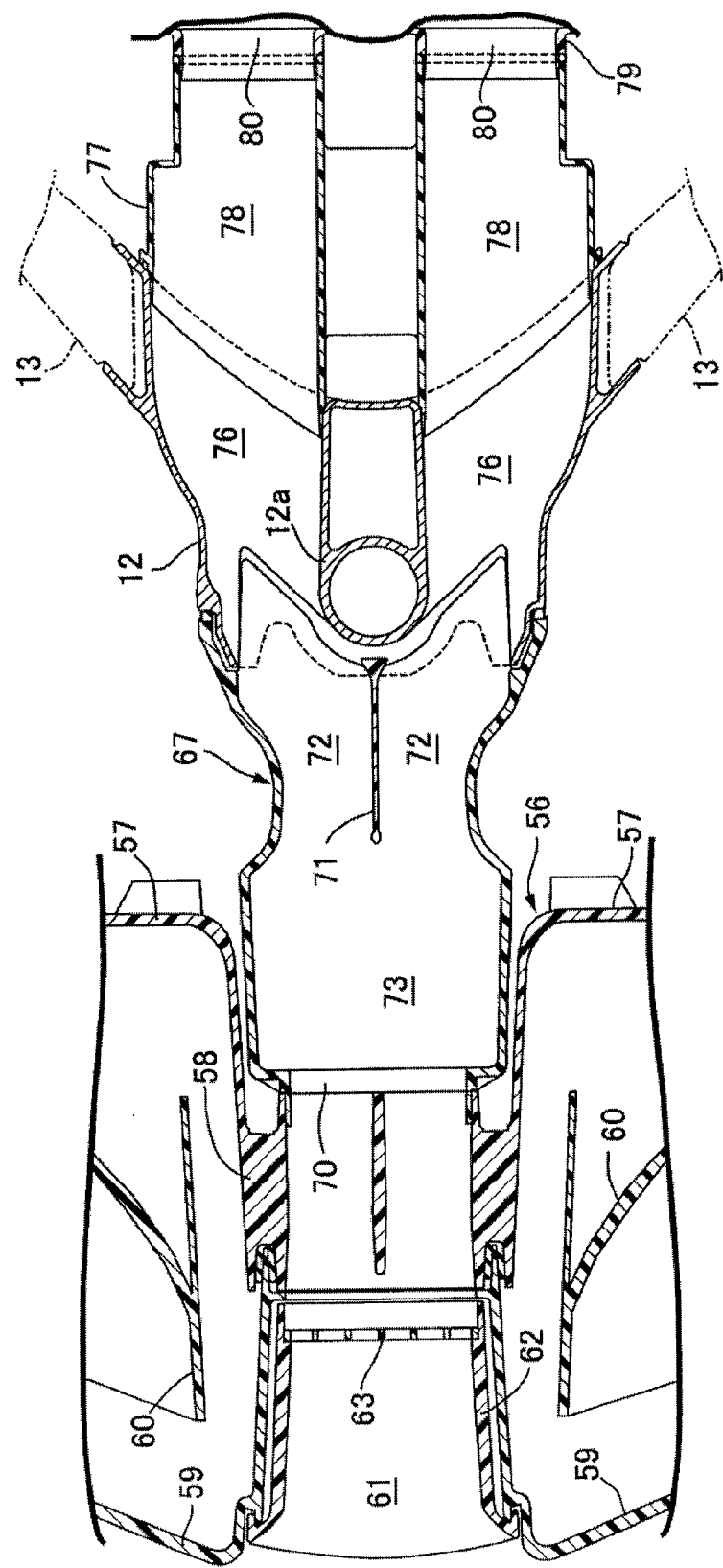
FIG. 5 is a sectional view taken along 5-5 line in FIG. 3.

As illustrated in FIG. 5, the headlight assembling body 56 has a right and left pair of light cases 57, 57 formed in a forward open bowl-shape; a cylindrical connecting portion 58 connecting between these light cases 57; lenses 59, 59 attached to the front portion of each light case 57 so as to cover the open ends of both light cases 57; reflectors 60, 60 contained in the paired light case 57 and lens 59 respectively; light assembly (not shown) disposed on the center portion of these reflectors 60. The headlight assembling body is attached to the outer cowl 51 of the front cowl 40 so as to plug up the opening portion 55.

Figure 6:
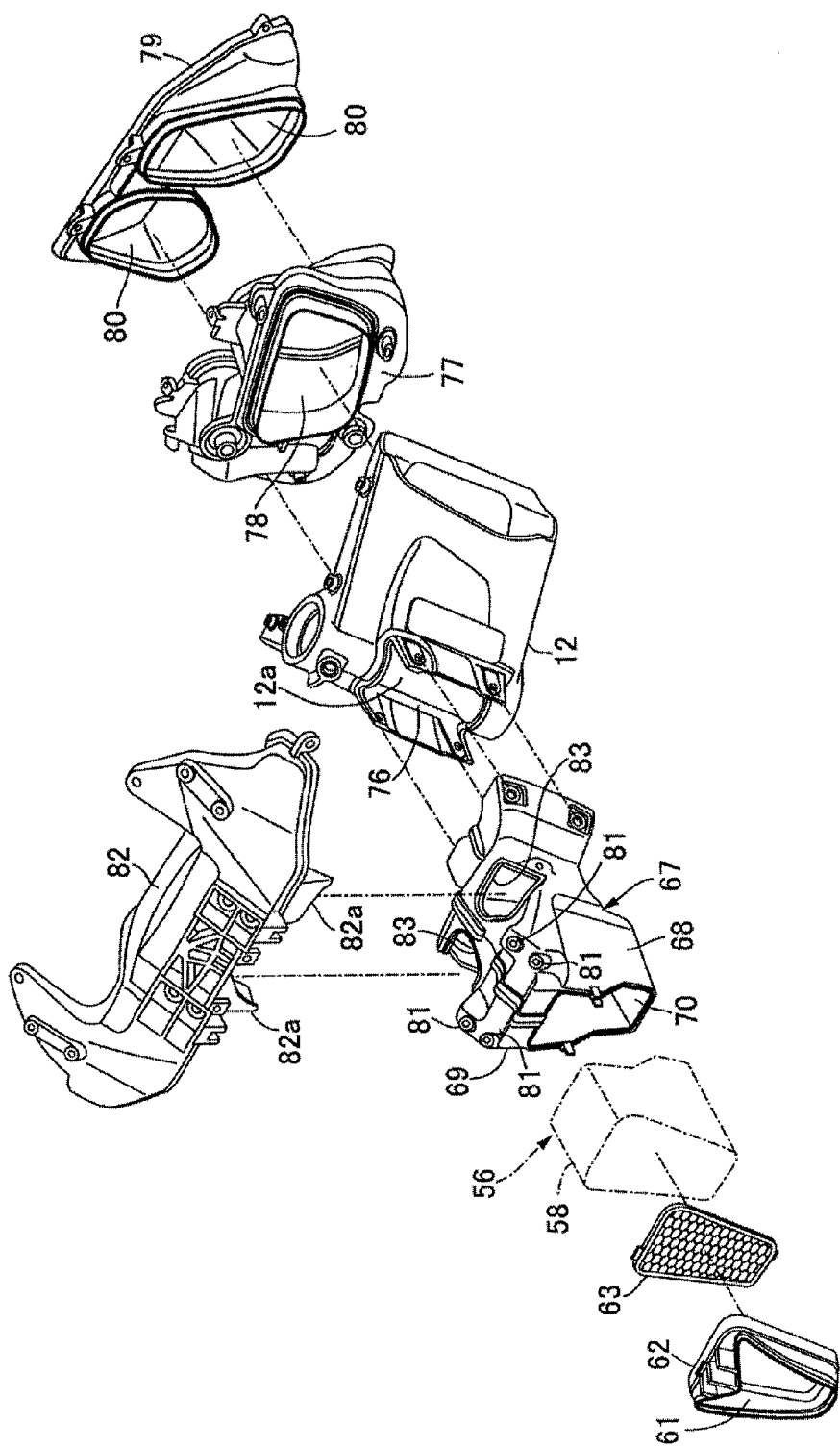
FIG. 6 is an exploded perspective view illustrating the air guiding structure which guides the air flow guided from the air flow inlet to the air cleaner.

As illustrated in FIG. 6, a cylindrical air flow inlet cylinder 62 forming an air flow inlet 61 opened to the front direction is disposed so as to connect the rear end portion thereof to the front end portion of the connecting portion 58 between both lenses 59. A louver 63 which has a mesh shape for bird repeller is inserted and fixed in the rear portion of the air flow inlet cylinder 62.

In other words, head lights 64, 64 are arranged at the predetermined position on both right and left sides of the front portion of the front cowl 40. An air flow inlet 61 is provided on the front end portion of the front cowl 40 so as to be disposed between these head lights 64.

Figure 7:
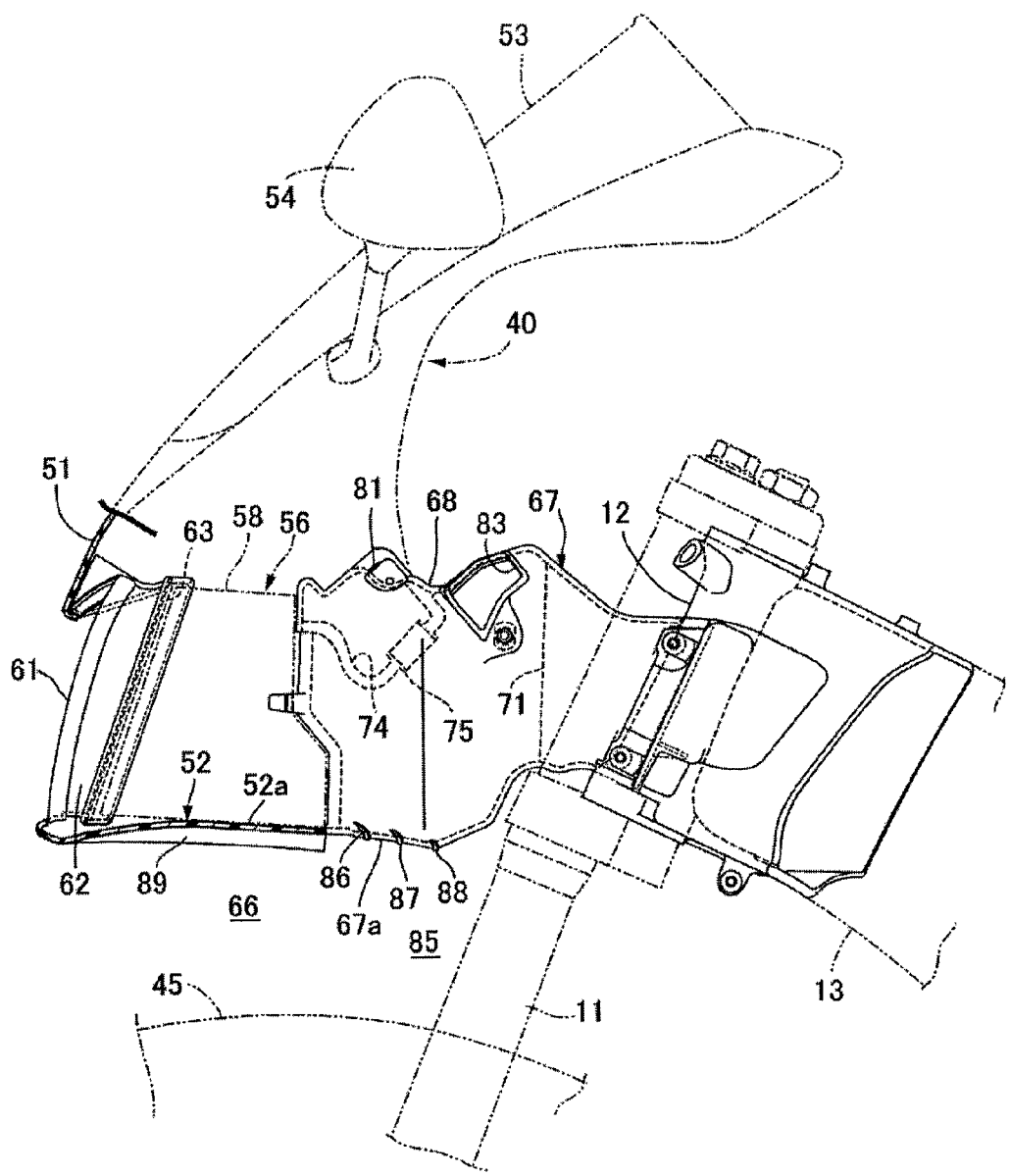
FIG. 7 is a side view illustrating the main part of air guiding structure from the air flow inlet to the head pipe.

In FIG. 7, a part of the inner cowl 52 includes the bottom plate 52a of the front cowl 40 so as to extend from the front edge of the outer cowl 51 to the rear direction with an air intake passage 66 guiding the air flow to the internal combustion engine E side being formed between the bottom plate 52a and the upper surface of the front fender 45.

A single air intake duct 67 is disposed above the front fender 45 in order to supply the air guided from the air flow inlet 61 provided on the front end portion of the front cowl 40 to the air cleaner 35 of the inlet system 34 in the internal combustion engine E. At least a part of the air intake duct 67 which is the front portion of the air intake duct 67 in the present embodiment is contained in the front cowl 40.

Figure 8:
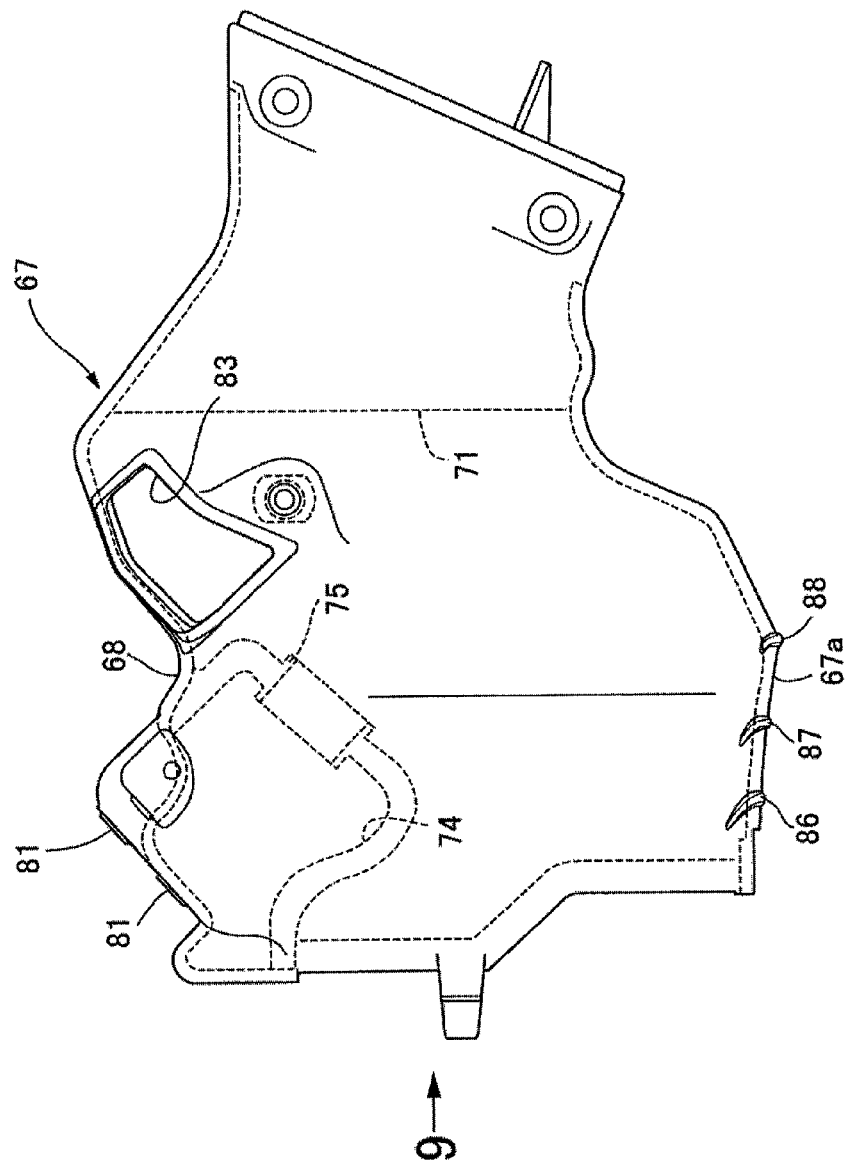
FIG. 8 is a side view of the air intake duct.
Figure 9:
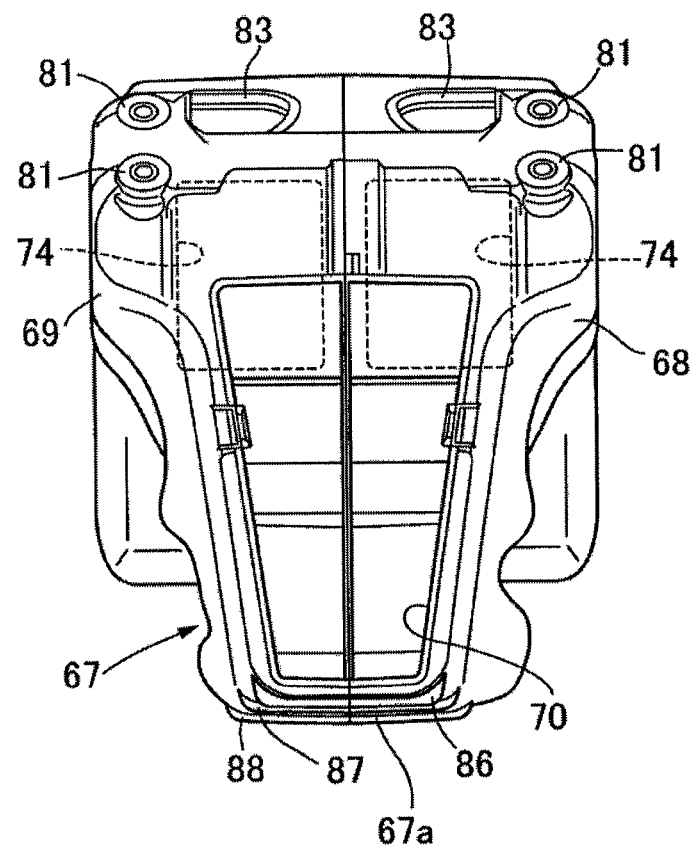
FIG. 9 is a front view in the direction of 9-arrow in FIG. 8.

As illustrated in FIGS. 8 and 9, the air intake duct 67 consists of a right and left pair of duct hemi bodies 68, 69 which are combined with each other and includes a rectangular cross-sectional shape. Moreover, an inlet opening 70 connected to the rear end of the cylindrical connecting portion 58 in the headlight assembly body 56 is formed on the front end portion of the air intake duct 67. A right and left pair of outlet openings 72, 72 separated by a partition wall 71 so as to divide the inside space of air intake duct 67 into the right and left is formed on the rear portion of the air intake duct 67. An air passage 73 is formed inside the air intake duct 67 so as to flow the air guided from the inlet opening 70 to both outlet openings 72.

In addition, a right and left pair of resonance chambers 74, 74 are formed on the front portion inside the air intake duct 67 so as to be separated from the air passage 73. These resonance chambers 74 communicate towards the air passage 73 through the communication pipe 75.

Now, the head pipe 12 in the body frame F has a supporting cylindrical portion 12a steerably supporting the front fork 11 and simultaneously includes a right and left pair of passages 76, 76 which are positioned on both right and left sides of the supporting cylindrical portion 12a. The rear end portion of the air intake duct 67 is connected to the head pipe 12 so as to communicate the outlet opening 72 on the rear end portion of the air intake duct 67 to the passages 76 on both right and left sides of the supporting cylindrical portion 12a.

In addition, the passages 76 of the head pipe 12 are communicated to two air passages 78, 78 in the right and left included in a joint 77 attached to the head pipe 12 from behind, as shown in FIGS. 5 and 6. Moreover, an air inlet member 79 shown in FIG. 6 is connected to the joint 77. The air inlet member 79 is attached to the air cleaner 35 of the inlet system 34. The two air passages 78 of the joint 77 are communicated to two inlet passages 80, 80 included in the air inlet member 79, respectively.

Four stay fastening bosses 81, 81 project on the upper surface of the air intake duct 67. A meter stay 82 is fastened on these stay fastening bosses 81, 81 to attach a meter which is not shown. The meter stay 82 has a right and left pair of hollow portions 82a, 82a. These hollow portions 82a are inserted into a right and left pair of inserting holes 83, 83 which are provided on the upper surface of the air intake duct 67 behind the resonance chambers 74, and are in communication with the air passage 73 inside the air intake duct 76. Then, the hollow portions 82a function as an air reservoir. When throttles of the internal combustion engine E are opened rapidly and so on, the air inside the hollow portions 82a is temporally supplied to the air passage 73, which ease the negative pressure change in the air passage 73.

Then, at least a part of the air intake duct 67, which is the front portion of the air intake duct 67 in the present embodiment is contained in the front cowl 40 at the center portion in the width direction of the vehicle. As shown in FIG. 7, a rear air intake passage 85, connected from behind to the air intake passage 66 and provided between the bottom plate 52a of the front cowl 40 and the upper surface of the front fender 45, is formed between the air intake duct 67 and the upper surface of the front cowl 45.

Furthermore, air guiding portions 86, 87, 88 guiding the air flow to the radiator 33 side project on at least a part of the air intake duct 67 which is the lower surface of the lowest bottom wall 67a in the present embodiment.

The lower surface of the lowest bottom wall 67a of the air intake duct 67 is formed in a flat. For example, three air guiding portions 86, 87, 88 extending towards the width direction of the vehicle are integrally formed so as to project downwardly on the lower surface thereof.

The lowest bottom wall 67a of the air intake duct 67 is disposed from behind in the vicinity of the center portion along the width direction of the vehicle of the bottom plate 52a of the front cowl 40. The foremost air guiding portion 86 among the plurality of air guiding portions 86, 87, 88 is integrally formed on the front end portion of the lower surface of the lowest bottom wall 67a.

In addition, the lower surface of the lowest bottom wall 67a is formed as the continuously inclined surface so as to be gradually lowered as it extends rearwardly. The air guiding portions 86, 87, 88 are integrally formed so as to be spaced apart in the forward and rearward directions on the lower surface of the lowest bottom wall 67a. The rearmost air guiding portion 88 among the plurality of air guiding portions 86, 87, 88 is integrally formed at the rearmost end of the lower surface of the lowest bottom wall 67a.

The lowest bottom wall 67a of the air intake duct 67 is formed so as to gradually extend the width along the width direction of the vehicle as it extends rearwardly. The widths along the width direction of the vehicle of the plurality of air guiding portions 86, 87, 88, disposed so as to be spaced apart in the front and rear direction, are differently set from each other according to the width of the lowest bottom wall 67a.

In other word, due to the fact that the lowest bottom wall 67a is formed so as to gradually extend the width along the width direction of the vehicle as it extends rearwardly, the widths along the width direction of the vehicle of the air guiding portions 86, 87, 88 is set wider as the air guide portion is positioned further rearwardly. Accordingly, the width of a straight line L, L connecting both ends of the air guiding portions 86, 87, 88 along the width direction of the vehicle becomes wider as it extends rearwardly, as shown in FIG. 4.

Furthermore, the groove 89 is formed on the lower surface of the center portion along the width direction of the vehicle of the bottom plate 52a of the front cowl 40 so as to be concaved upwardly and so as to extend to in the forward and rearward directions. The air guiding portions 86, 87, 88 are disposed within the maximum width of the groove 89 in the front view of the vehicle, as shown in FIG. 3.

In addition, as shown in FIG. 4, a concaved portion 90 concaved forward in a V-shape in the plane view is formed on the rear end of the central portion along the width direction of the vehicle of the bottom plate 52a of the front cowl 40. The air guiding portions 86, 87, 88 are disposed within the concaved portion 90 in the plane view.

Next, functions of the present embodiment will be explained. The air intake duct 67, disposed above the front fender 45 such that at least a part thereof is contained in the front cowl 40 for supplying the air guided from the air flow inlet 61 provided on the front end portion of the front cowl 40 to the inlet system 34 of the internal combustion engine E, is disposed above the front fender 45. The rear air intake passage 85, connected from behind to the air intake passage 66 formed between the bottom plate 52a of the front cowl 40 and the upper surface of the front fender 45, is formed between the air intake duct 67 and the front fender 45. The air guiding portions 86, 87, 88 guiding the air flow to the radiator 33 side project on the lower surface of the lowest bottom wall 67a of the air intake duct 67. Accordingly, the air flow flowing through the air intake passage 66 and the rear air intake passage 85 is guided to the radiator 33 side, which can enhance the cooling performance of the radiator 33. In addition, since the air guiding portions are not provided on the front cowl 40, the front cowl 40 is not bulged downwardly by the air guiding portions. The air resistance can be reduced by lowering the position of the front cowl 40.

Furthermore, at least a part of the single air intake duct 67 having a rectangular cross-sectional shape is contained in the front cowl 40 at the center portion in the width direction of the vehicle. The air guiding portions 86, 87, 88 extending in the width direction of the vehicle are integrally formed on the flat lower surface of the lowest bottom wall 67a of the air intake duct 67 so as to be projected downwardly. Accordingly, the air guiding portions 86, 87, 88 are formed so as to be wide in the width direction of the vehicle for increasing the area thereof, which can enhance the air intake effect.

In addition, the lowest bottom wall 67a of the air intake duct 67 is disposed from behind in the vicinity of the center portion along the width direction of the vehicle of the bottom plate 52a of the front cowl 40, and the air guiding portion 86 is integrally formed on the front end portion of the lower surface of the lowest bottom wall 67a. Accordingly, the air guiding portion 86 just behind the bottom plate 52a can certainly guide the air flow flowing along the lower surface of the bottom plate 52a of the front cowl 40 to the radiator 33 side.

Moreover, the lower surface of the lowest bottom wall 67a is formed as a continuously inclined surface so as to be gradually lowered as it extends rearwardly. Accordingly, the lower surface of the lowest bottom wall 67a can certainly guide the air flow to the radiator 33 side.

In addition, the plurality of (for example, three) air guiding portions 86, 87, 88 are integrally formed so as to be spaced apart in the forward and rearward directions on the lower surface of the lowest bottom wall 67a. Accordingly, even if the front portion of the motorcycle tends to be lifted due to the posterior load during acceleration of the motorcycle, any one of the plurality of air guiding portions 86, 87, 88 can guide the air flow. The air intake effect to the radiator 33 side can be expected regardless of the driving state of the motorcycle.

In addition, the rearmost air guiding portion 88 among the plurality of air guiding portions 86, 87, 88 is integrally formed at the rearmost end of the lower surface of the lowest bottom wall 67a. Accordingly, the rearmost air guiding portion 88 can guide the air flow flowing rearwardly along the inclined lower surface of the lowest bottom wall 67a to the radiator 33 side, diverting the flow from the lower surface of the lowest bottom wall 67a, which can enhance the air intake performance.

Moreover, the lowest bottom wall 67a of the air intake duct 67 is formed so as to gradually extend the width along the width direction of the vehicle as it extends rearwardly. The widths along the width direction of the vehicle of the plurality of air guiding portions 86, 87, 88 are disposed so as to be spaced apart in the forward and rearward directions are differently set from each other according to the width of the lowest bottom wall 67a. Accordingly, the rear air guiding portions 87, 88 can guide the air flow passing through both sides of the foremost air guiding portion 86. The rearmost air guiding portion 88 can certainly guide the air flow passing through both sides of the air guiding portion 87 to the radiator 33 side.

In addition, the groove 89 is formed on the lower surface of the center portion along the width direction of the vehicle of the bottom plate 52a of the front cowl 40 so as to be concaved upwardly and to extend to the front and rear direction. The air guiding portions 86, 87, 88 are disposed within the maximum width of the groove 89 in the front view of the vehicle. Accordingly, the air flow can be guided to the air guiding portions 86, 87, 88 side by using the groove 89 of the lower surface of the bottom plate 52a, which can enhance the air intake effect.

Moreover, the concaved portion 90 concaved forward in a V-shape in a plane view is formed on the rear end of the central portion along the width direction of the vehicle of the bottom plate 52a of the front cowl 40. The air guiding portions 86, 87, 88 are disposed within the concaved portion 90 in the plane view. Accordingly, the air guiding portions 86, 87, 88 can be disposed in the vicinity of the front cowl 40, and the air guiding portions 86, 87, 88 can guide the air flow passing through below the front cowl 40 in the upstream side of the flowing direction.

As above-mentioned, the embodiment of the present invention has been explained. The present invention is not limited to the above-mentioned embodiment. Various changes can be applied on design without deviation from the scope of the present invention.

For example, the heat exchanger is explained as the radiator 33 in the above-mentioned embodiment. However, the present invention can be also applied to the case that an oil cooler is explained as the heat exchanger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle having an internal combustion engine mounted on a body frame; a front fork steerably supported by a head pipe on a front end portion of the body frame for axially supporting a front wheel and for supporting a front fender covering at least a part of the front wheel from above; a heat exchanger disposed behind said front wheel and in front of said combustion engine; an air intake passage guiding an air flow to said internal combustion engine side, said air intake passage being formed between an upper surface of said front fender and a bottom plate of a front cowl covering said head pipe from the front, disposed just above said front wheel and supported on said body frame, comprising:

a front air guiding structure includes an air intake duct contained in said front cowl for supplying air guided from an air flow inlet provided on a front end portion of said front cowl to an inlet system of said internal combustion engine, said air intake duct being disposed above said front fender and a rear air intake passage connecting to said air intake passage from behind said air intake duct, and air guiding portions guiding air flow to said heat exchanger side, said air guiding portions projecting at least on a lower surface of a lowest bottom wall of said air intake duct.

2. The front air guiding structure of motorcycle according to claim 1, wherein at least a part of said air intake duct having a rectangular cross-sectional shape is contained in said front cowl at a center portion in a width direction of the vehicle, said air guiding portions extending to the width direction of the vehicle are integrally formed so as to project downwardly on the lower surface of said lowest bottom wall of said air intake duct.

3. The front air guiding structure of motorcycle according to claim 2, wherein said lowest bottom wall of said air intake duct is disposed from behind in a vicinity of the center portion along the width direction of the vehicle of said bottom plate of said front cowl, said air guiding portions are integrally formed at least on a front end portion of said lower surface of said lowest bottom wall.

4. The front air guiding structure of motorcycle according to claim 3, wherein said lower surface of said lowest bottom wall is formed as a continuously inclined surface so as to be gradually lowered as it extends rearwardly.

5. The front air guiding structure of motorcycle according to claim 2, wherein said lower surface of said lowest bottom wall is formed as a continuously inclined surface so as to be gradually lowered as it extends rearwardly.

6. The front air guiding structure of motorcycle according to claim 5, wherein a plurality of air guiding portions are integrally formed so as to be spaced apart in forward and rearward directions on said lower surface of said lowest bottom wall.

7. The front air guiding structure of motorcycle according to claim 6, wherein a rearmost air guiding portion among said plurality of air guiding portions is integrally formed at a rearmost end of said lower surface of said lowest bottom wall.

8. The front air guiding structure of motorcycle according to claim 7, wherein at least said lowest bottom wall of said air intake duct is formed so as to gradually increase in width as the lowest bottom wall extends rearwardly, each of said plurality of air guiding portions has a predetermined width and each is disposed so as to be spaced apart a predetermined distance in the forward and rearward directions along the lowest bottom wall.

9. The front air guiding structure of motorcycle according to claim 7, wherein a groove is formed on the lower surface of the center portion along the width direction of the vehicle of said bottom plate of said front cowl so as to be concaved upwardly and so as to extend towards the forward and rearward directions, said air guiding portions are disposed within the maximum width of said groove in the front view of the vehicle.

10. The front air guiding structure of motorcycle according to claim 7, wherein a concaved portion concaved forward in a V-shape in a plane view is formed on a rear end of the central portion along the width direction of the vehicle of said bottom plate of said front cowl, and said air guiding portions are disposed within said concaved portion in the plane view.

11. The front air guiding structure of motorcycle according to claim 6, wherein at least said lowest bottom wall of said air intake duct is formed so as to gradually increase in width as the lowest bottom wall extends rearwardly, each of said plurality of air guiding portions has a predetermined width and each is disposed so as to be spaced apart a predetermined distance in the forward and rearward directions along the lowest bottom wall.

12. The front air guiding structure of motorcycle according to claim 11, wherein a groove is formed on the lower surface of the center portion along the width direction of the vehicle of said bottom plate of said front cowl so as to be concaved upwardly and so as to extend towards the forward and rearward directions, said air guiding portions are disposed within the maximum width of said groove in the front view of the vehicle.

13. The front air guiding structure of motorcycle according to claim 11, wherein a concaved portion concaved forward in a V-shape in a plane view is formed on a rear end of the central portion along the width direction of the vehicle of said bottom plate of said front cowl, and said air guiding portions are disposed within said concaved portion in the plane view.

14. The front air guiding structure of motorcycle according to claim 6, wherein a groove is formed on the lower surface of the center portion along the width direction of the vehicle of said bottom plate of said front cowl so as to be concaved upwardly and so as to extend towards the forward and rearward directions, said air guiding portions are disposed within the maximum width of said groove in the front view of the vehicle.

15. The front air guiding structure of motorcycle according to claim 14, wherein a concaved portion concaved forward in a V-shape in a plane view is formed on a rear end of the central portion along the width direction of the vehicle of said bottom plate of said front cowl, and said air guiding portions are disposed within said concaved portion in the plane view.

16. In a motorcycle having an internal combustion engine comprising:
   a front fender covering at least a part of a front wheel from above;
   a heat exchanger disposed behind said front wheel and in front of said combustion engine;
   an air intake passage guiding an air flow to said internal combustion engine side, said air intake passage being formed between an upper surface of said front fender and a bottom plate of a front cowl covering a head pipe from a front side, disposed just above said front wheel and supported on a body frame; and
   a front air guiding structure includes at least a part of an air intake duct contained in said front cowl for supplying air guided from an air flow inlet provided on a front end portion of said front cowl to an inlet system of said internal combustion engine, said air intake duct being disposed above said front fender and a rear air intake passage connecting to said air intake passage from behind said air intake duct, and air guiding portions guiding air flow to said heat exchanger side, said air guiding portions projecting at least on a lower surface of a lowest bottom wall of said air intake duct.

17. The front air guiding structure of motorcycle according to claim 16, wherein at least a part of said air intake duct having a rectangular cross-sectional shape is contained in said front cowl at a center portion in a width direction of the vehicle, said air guiding portions extending to the width direction of the vehicle are integrally formed so as to project downwardly on the lower surface of said lowest bottom wall of said air intake duct.

18. The front air guiding structure of motorcycle according to claim 17, wherein said lowest bottom wall of said air intake duct is disposed from behind in a vicinity of the center portion along the width direction of the vehicle of said bottom plate of said front cowl, said air guiding portions are integrally formed at least on a front end portion of said lower surface of said lowest bottom wall.

19. The front air guiding structure of motorcycle according to claim 17, wherein said lower surface of said lowest bottom wall is formed as a continuously inclined surface so as to be gradually lowered as it extends rearwardly.

20. In a motorcycle having an internal combustion engine mounted on a body frame; a front fork steerably supported by a head pipe on a front end portion of the body frame for axially supporting a front wheel and for supporting a front fender covering at least a part of the front wheel from above; a heat exchanger disposed behind said front wheel and in front of said combustion engine; an air intake passage guiding an air flow to said internal combustion engine side, said air intake passage being formed between an upper surface of said front fender and a bottom plate of a front cowl covering said head pipe from the front, disposed just above said front wheel and supported on said body frame, comprising:
   a front air guiding structure includes an air intake duct contained in said front cowl for supplying air guided from an air flow inlet provided on a front end portion of said front cowl to an inlet system of said internal combustion engine, said air intake duct being disposed above said front fender and a rear air intake passage connecting to said air intake passage from behind said air intake duct, and air guiding portions guiding air flow to said heat exchanger side, said air guiding portions projecting at least on a lower surface of a lowest bottom wall of said air intake duct wherein the lower surface of the lowest bottom wall is formed as a continuously inclined surface so as to be gradually lowered as it extends rearwardly;

at least a part of said air intake duct having a rectangular cross-sectional shape is contained in said front cowl at a center portion in a width direction of the vehicle, said air guiding portions extending to the width direction of the vehicle are integrally formed so as to project downwardly on the lower surface of said lowest bottom wall of said air intake duct;

a plurality of air guiding portions are integrally formed so as to be spaced apart in a forward and rearward directions on said lower surface of said lowest bottom wall; and a concaved portion concaved forward in a V-shape in a plane view is formed on a rear end of the central portion along the width direction of the vehicle of said bottom plate of said front cowl, and said air guiding portions are disposed within said concaved portion in the plane view.

* * * * *